(12) United States Patent
Milliere

(10) Patent No.: US 6,729,583 B2
(45) Date of Patent: May 4, 2004

(54) DEVICE FOR ARTICULATING A FLAP TO AN AIRCRAFT AERODYNAMIC SURFACE

(75) Inventor: Jérôme Milliere, Leguevin (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/440,300

(22) Filed: May 19, 2003

(65) Prior Publication Data

US 2003/0230677 A1 Dec. 18, 2003

(30) Foreign Application Priority Data

Jun. 13, 2002 (FR) .............................................. 02 07266

(51) Int. Cl.⁷ .................................................. B64C 3/50
(52) U.S. Cl. ......................................... 244/213; 244/89
(58) Field of Search ............................ 244/213, 37, 38, 244/39, 206, 210, 211, 212, 215, 216, 217, 89, 90 A, 90 B

(56) References Cited

U.S. PATENT DOCUMENTS

| | | | | |
|---|---|---|---|---|
| 1,810,693 A | * | 6/1931 | Alfaro | 244/211 |
| 2,282,516 A | * | 5/1942 | Gropler | 244/216 |
| 2,289,704 A | * | 7/1942 | Grant | 244/225 |
| 2,319,383 A | * | 5/1943 | Zap | 244/90 R |
| 2,383,102 A | * | 8/1945 | Zap | 244/90 R |
| 3,677,504 A | * | 7/1972 | Schwarzler | 244/212 |
| 3,949,957 A | * | 4/1976 | Portier | 244/210 |
| 4,015,787 A | * | 4/1977 | Maieli et al. | 244/215 |
| 4,120,470 A | * | 10/1978 | Whitener | 244/213 |
| 4,181,275 A | * | 1/1980 | Moelter et al. | 244/213 |
| 4,715,567 A | * | 12/1987 | Poccard | 244/213 |
| RE32,907 E | * | 4/1989 | Rudolph | 244/215 |
| 5,388,788 A | * | 2/1995 | Rudolph | 244/215 |
| 5,622,336 A | | 4/1997 | Chavanne et al. | |
| 5,735,485 A | | 4/1998 | Ciprian et al. | |
| 6,328,265 B1 | * | 12/2001 | Dizdarevic | 244/213 |

FOREIGN PATENT DOCUMENTS

| | | |
|---|---|---|
| CH | 683982 A5 | 6/1994 |
| FR | 2718707 | 10/1995 |
| FR | 2728535 | 6/1996 |

* cited by examiner

Primary Examiner—Charles T. Jordan
Assistant Examiner—Stephen Holzen
(74) Attorney, Agent, or Firm—Stevens, Davis, Miller & Mosher, LLP.

(57) ABSTRACT

An articulation device for articulating a flap to an aircraft aerodynamic surface, the flap having its front edge facing a rear edge of the aerodynamic surface and the articulation device including two fittings bearing the flap. The articulation device pivots about a common axle borne by the aerodynamic surface and arranged at the interior side thereof, in order to cause the flap to adopt either a retracted position or a deployed position. The portion of each fitting facing a corresponding cutout, when the flap is in the retracted position, is set back toward the inside with respect to the outer faces of the aerodynamic surface and the flap. A flat blanking piece, the shape of which corresponds to that of the cutout, is associated with each cutout. Each blanking piece is borne by a linkage articulated to the aerodynamic surface and to the flap.

16 Claims, 3 Drawing Sheets

DEVICE FOR ARTICULATING A FLAP TO AN AIRCRAFT AERODYNAMIC SURFACE

FIELD OF THE INVENTION

The present invention relates to a device for articulating a flap to an aircraft aerodynamic surface. Although not exclusively, the articulation device according to the present invention is particularly suited to articulating spoiler flaps incorporated in housings provided in the suction face of the wings of an airplane.

BACKGROUND OF THE RELATED ART

In known articulation devices of this type, a flap, for example a spoiler, has its front edge facing a rear edge (for example the trailing edge or the edge of such a housing) of said aerodynamic surface (for example a wing) and the articulation device comprises at least two fittings bearing said flap projecting forward with respect to said front edge of the flap and able to pivot, under the action of actuating means (generally rams), about a common axle borne by said aerodynamic surface and arranged at the interior side thereof. Thus, said flap can adopt:

either a retracted position, for which the outer face (for example the suction face) of said flap is in the aerodynamic continuation of the outer face (for example the suction face) of said aerodynamic surface;

or deployed positions, for which said flap is turned and projects with respect to said outer face of the aerodynamic surface.

In such an articulation device, in order to avoid the slot between said rear edge of the aerodynamic surface and said front edge of said flap being too wide, as this would lead to a great deal of drag, provision is made for said rear edge of the aerodynamic surface to comprise cutouts into which said fittings can project when said flap is in the deployed position. In addition, each fitting has a blanking portion which forms an integral part of said fitting, is manufactured with it and is identical for all the fittings and which, when the flap is in the retracted position, lies inside the corresponding cutout, flush with the outer faces of the aerodynamic surface and of the flap.

Between said fittings, there is a seal, for example of the sausage type, borne by said rear edge of the aerodynamic surface and blanking off said slot there is between said front and rear edges, when the flap is in the retracted position. By contrast, between the edge of said cutouts and the blanking portions of said fittings, there is a functional clearance made necessary by the assembly and manufacturing tolerances, and that has been hitherto impossible to blank off and is the cause of aerodynamic leakage giving rise to parasitic drag.

Such parasitic drag is relatively low and is acceptable when the size of the airplane is that of conventional commercial airplanes. By contrast, in the case of very large commercial airplanes, it becomes unacceptable because the flaps are then themselves very large, especially the fittings, and the clearance needs to be large in order to absorb the assembly and manufacturing tolerances and allow said flaps to move.

SUMMARY OF THE INVENTION

The purpose of the present invention is therefore to remedy this drawback by effectively blanking off the functional clearance between said cutouts and said fittings when said flap is in the retracted position, without impeding the deployment of said flap when the latter needs to become active.

To this end, according to the invention, the device for articulating a flap to an aircraft aerodynamic surface, said flap having its front edge facing a rear edge of said aerodynamic surface and said articulation device comprising at least two fittings bearing said flap projecting forward with respect to said front edge and able to pivot, under the action of actuating means, about a common axle borne by said aerodynamic surface and arranged at the interior side thereof, in order to cause said flap to adopt:

either a retracted position, for which the outer face of said flap is in the aerodynamic continuation of the outer face of said aerodynamic surface;

or at least one deployed position, for which said flap is turned and projects with respect to the outer face of said aerodynamic surface, said rear edge of said aerodynamic surface comprising cutouts into which said fittings project when said flap is in the deployed position, is notable in that:

the portion of each fitting facing the corresponding cutout when said flap is in the retracted position is set back toward the inside with respect to the outer faces of the aerodynamic surface and of the flap;

associated with each cutout is a flat blanking piece, the shape of which corresponds to that of said cutout;

each blanking piece is borne by a linkage articulated to said aerodynamic surface and to said flap so that:

when said flap is in the retracted position, said linkage places said blanking piece in a blanking position for which said blanking piece is arranged in said cutout, ensuring aerodynamic continuity between said aerodynamic surface and said flap; and when said flap is in the deployed position, said linkage places said blanking piece in an outwardly offset position for which said blanking piece uncovers said cutout, allowing said flap to turn with respect to said aerodynamic surface.

As a preference, said blanking piece is fixed removably and/or adjustably to said linkage.

Thus, by virtue of these arrangements according to the present invention, the position and/or the size of each flat blanking piece can be tailored, to take account of the actual functional clearance, to the particular cutout in which it is to be housed, so as to optimize and/or minimize the slot needed between it and the edge of the cutout. To make this idea that underlies the present invention easier to implement, said blanking piece can be chosen from a set of blanking pieces of different sizes, manufactured in advance and covering the various likely clearances due to the assembly tolerances and encountered in the manufacture of the aircraft.

In one advantageous and particularly simple linkage embodiment, this linkage comprises:

at least one first connecting rod articulated, at one end, to said aerodynamic surface and bearing, at the other end, said blanking piece; and at least one second connecting rod articulated, at one end, to said flap and, at the other end, to said first connecting rod.

Advantageously, said first connecting rod has a convoluted shape allowing it, when said flap is in the deployed position, to go around the edge of the blind end of said cutout.

To further improve the seal between said blanking piece and the edge of the corresponding cutout, provision may be made:

for the front edge of said blanking piece to bear a seal able, when the flap is in the retracted position, to blank off the slot there is between it and the edge of the blind end of said cutout; and/or for the rear edge of said blanking piece to bear a seal able, when the flap is in the retracted position, to blank off the slot there is between it and the front edge of said flap.

Furthermore, in order to avoid the multiplicity of blanking pieces and associated control linkages, according to another particular feature of the present invention, provision is made for:

said rear edge of the aerodynamic surface to be cut away between at least two consecutive cutouts to form one global cutout;

the portion of each fitting facing said global cutout when said flap is in the retracted position to be set back toward the inside with respect to the outer faces of the aerodynamic surface and of the flap;

a flat global blanking piece, the shape of which corresponds to that of said global cutout to be associated with said global cutout;

said global cutout to be borne by a linkage articulated to said aerodynamic surface and to said flap and such that:

when said flap is in the retracted position, said linkage places said global blanking piece in a blanking position for which said global blanking piece is arranged in said cutout, ensuring aerodynamic continuity between said aerodynamic surface and said flap; and when said flap is in the deployed position, said linkage places said global blanking piece in an outwardly offset position for which said global blanking piece uncovers said global cutout, allowing said flap to turn with respect to said aerodynamic surface.

Advantageously, the global blanking piece and said linkage may have the features of the blanking pieces and linkages described above.

BRIEF DESCRIPTION OF THE DRAWINGS

The figures of the attached drawing will make it easy to understand how the invention may be embodied. In these figures, identical references denote similar elements.

DETAILED DESCRIPTION OF THE INVENTION

Figure 1:
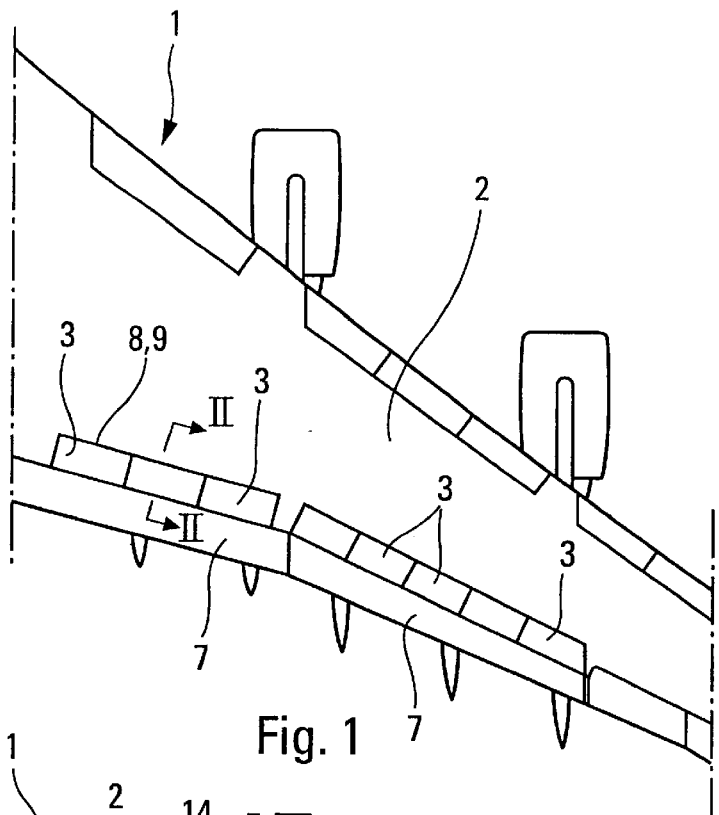
FIG. 1 is a partial plan view, from above, of a known airplane wing.

The known airplane wing 1, depicted schematically and partially in FIG. 1, comprises, in its suction face 2, a number of spoiler flaps 3, also known as spoilers in aeronautical parlance. These constitute aerodynamic control surfaces for the airplane, able to be turned under the action of rams 4 about an axle 5 borne by the wing, at the interior side thereof.

Figure 2:
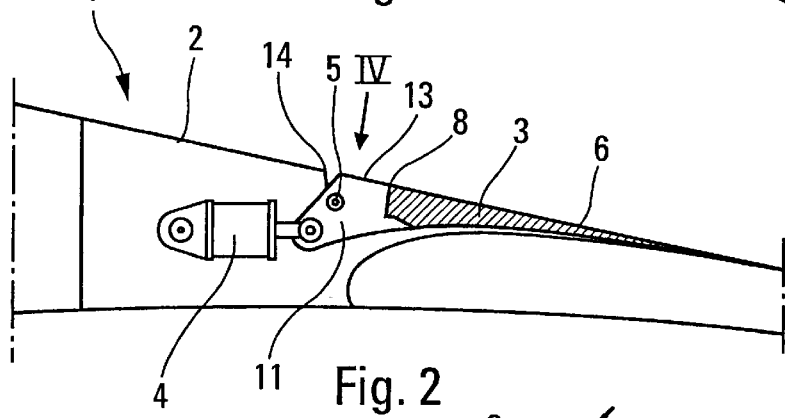
FIG. 2 is an enlarged view in cross section on II—II of FIG. 1, at a fitting of a spoiler of said wing, this spoiler being in the retracted position.

In the retracted position (see FIGS. 1, 2 and 4) they are integrated into the suction face 2 with their own suction face 6 in the aerodynamic continuation of the latter, and are generally arranged in front of the lift-augmenting flaps 7. In the deployed position (see FIG. 3) they give rise to a reduction in lift and an increase in drag of the wing 1, and this allows them to perform various functions.

Thus, said spoilers 3:

by increasing the drag, contribute to reducing the speed of the airplane during the landing or possibly take-off phases, if the take-off procedure is aborted should a problem be detected;

by reducing the lift, allow the airplane to be pressed down onto the ground to improve braking during the landing or aborted take-off phase;

contribute to the roll control by reducing the lift of half the wing span during flight;

allow the speed of the airplane to be reduced during flight or the angle of descent to be increased in the event of an emergency descent;

assist with reducing the wing/fuselage restrained bending moment (and therefore the load) at high load factors (during maneuvers, gusts) by altering the distribution of lift along the span of the wing;

through an asymmetric effect, make it possible to create a yaw moment and thus contribute to countering the effects of an engine failure on the ground during the take-off phase.

These various functions performed by the spoilers correspond to temporary conditions and to very particular moments in the flight of the airplane, which means that for most of the flight of the airplane, they play no part, being retracted, and their presence needs therefore to generate the least possible amount of drag.

Also, when said spoilers are not used, that is to say for most of the duration of the flight, they must be perfectly integrated into the suction face 2 of the wing 1, and this poses several problems.

Figure 3:
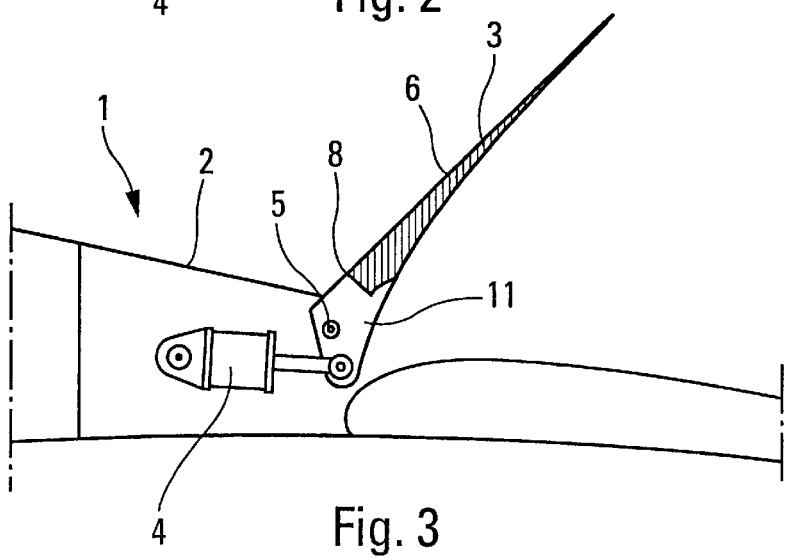
FIG. 3 is a view similar to FIG. 2, said spoiler being in the deployed position.
Figure 4:
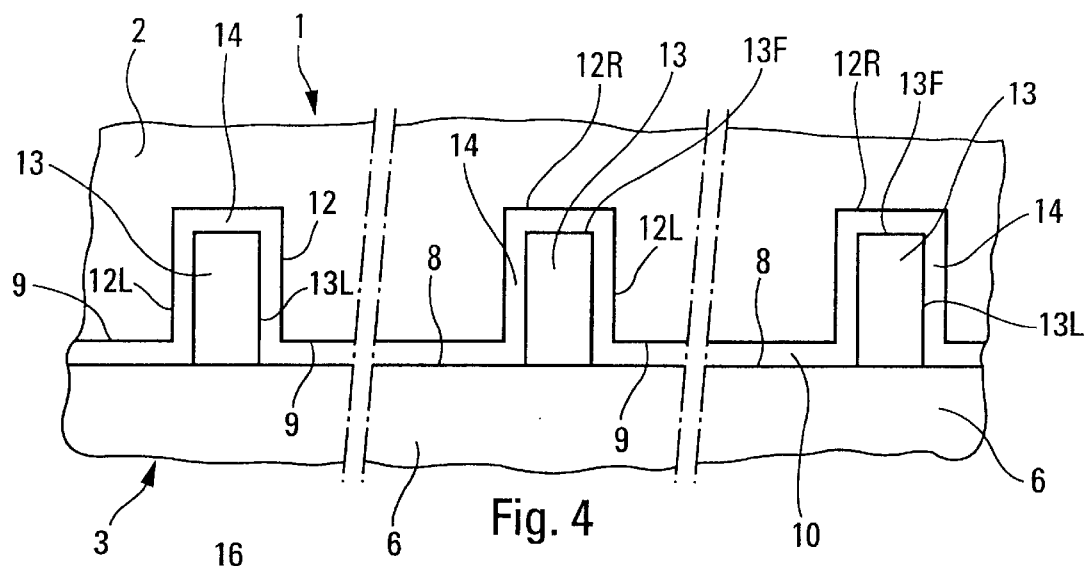
FIG. 4 is an enlarged view on arrow IV of FIG. 2.

Specifically, each spoiler 3 is, on the one hand, arranged in such a way that its front edge 8 is arranged facing a rear edge 9 of said wing 1 (said edges 8 and 9 being parallel to the axle 5), leaving a slot 10 between them and, on the other hand, borne by at least two fittings 11 projecting forward toward the inside of the wing 1 and mounted to pivot about the axle 5. The rear edge 9 of the wing 1 has cutouts 12 with two lateral edges 12L and a blind end edge 12R, to house said fittings 11 when the spoilers 3 are in the deployed position (FIG. 3). Each fitting 11 comprises a blanking portion 13, with two lateral edges 13L and a front edge 13F, which roughly speaking blanks off the cutouts 12 when the spoiler 3 is in the retracted position, forming a peripheral slot 14 around the latter and lying flush with the suction faces 2 and 6 (FIG. 4).

In a way which is known and not depicted, between the cutouts 12, the seal between the front edge 8 of a spoiler 3 and the rear edge 9 of the wing 1 is afforded by a sausage-type seal, not depicted.

Now that the prior art has been recalled hereinabove with reference to FIGS. 1 to 4, one embodiment of the present invention will now be described using FIGS. 5 to 8.

Figure 5:
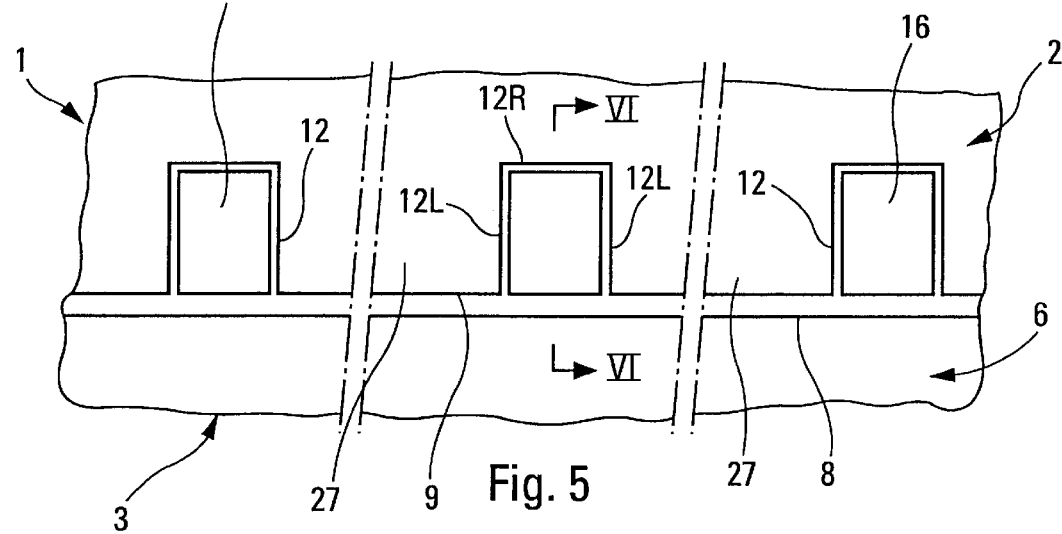
FIG. 5 illustrates, in a view similar to FIG. 4, an exemplary embodiment of the present invention, applied to spoilers.
Figure 6:
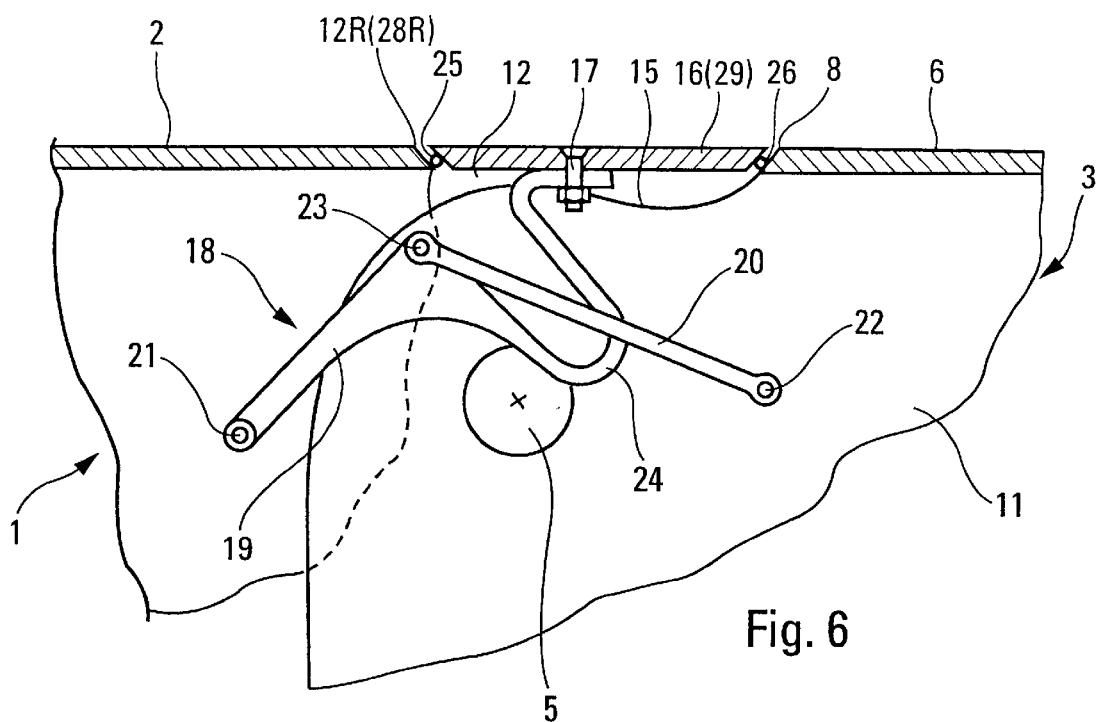
FIG. 6 is an enlarged section on VI—VI of FIG. 5 or of FIG. 8.
Figure 7:
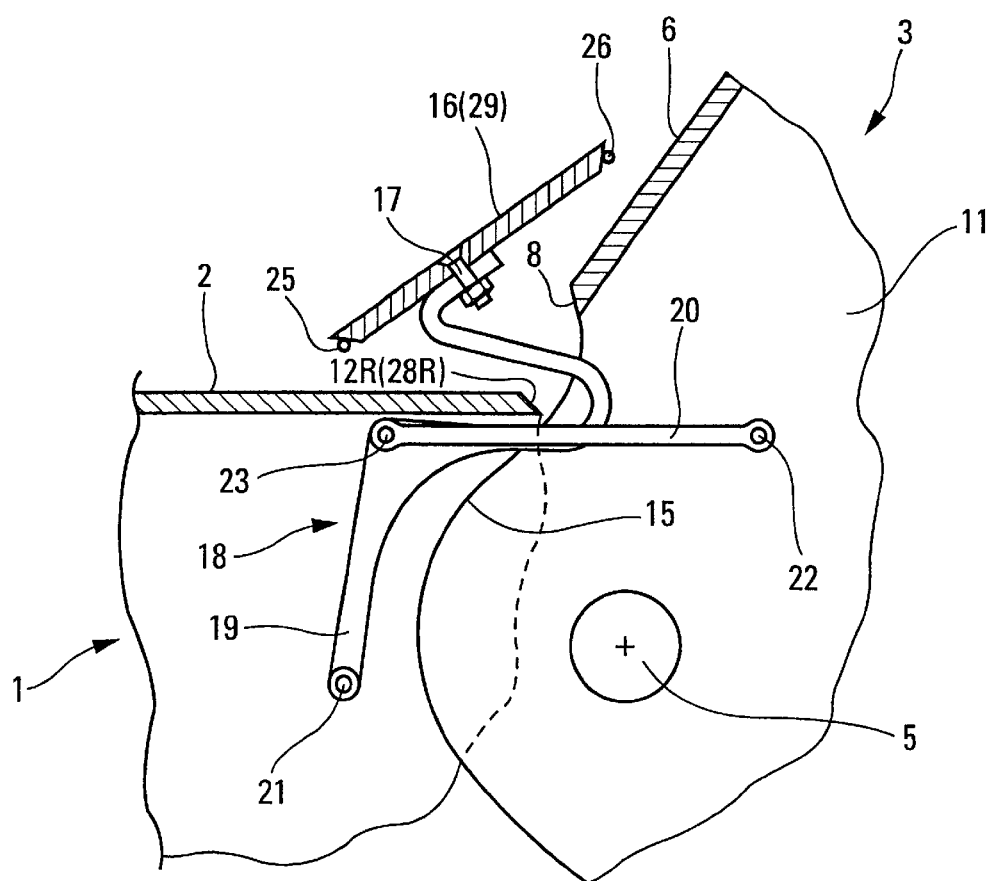
FIG. 7 is a view similar to FIG. 6, the spoiler being in the deployed position.

Referring first of all to FIGS. 5 to 7, it can be seen that the portion 15 of each fitting 11, which lies facing the corresponding cutout 12 when the flap 3 is in the retracted position is (unlike the portion 13 described above) set back toward the inside with respect to the suction faces 2 and 6 of the wing 1 and of the flap 3. In addition, associated with each cutout 12 is an individual flat blanking piece 16, chosen from a plurality of blanking pieces of different sizes so that, bearing in mind the essential functional clearances, it best blanks off the particular cutout 12 in which it is housed.

As illustrated by FIGS. 6 and 7, each individual blanking piece 16 is attached, by virtue of removable fixing means 17 such as screws or the like, to an articulated linkage 18 (described in greater detail hereinafter) which allows it:

when the flap 3 is in the retracted position, to adopt a blanking position (see FIGS. 5 and 6) for which said blanking piece 3 is arranged in the corresponding cutout 12, ensuring aerodynamic continuity between the suction faces 2 and 6;

when the flap 3 is in the deployed position, to adopt a position offset outward (see FIG. 7), arranged in the dihedral angle formed by the suction faces 2 and 6, for which position said blanking piece 3 uncovers the associated cutout 12 to allow the fitting 11 to enter it, thus allowing said flap 3 to turn with respect to the wing 1.

As a preference, the position of said blanking piece 16 is adjustable with respect to the removable fixing means 17 (for example by virtue of an oblong hole or several holes made in said blanking piece) so as to allow the position of said blanking piece 16 relative to the cutout 12 to be adjusted.

In the exemplary embodiment of FIGS. 6 and 7, the linkage 18 comprises at least two connecting rods 19 and 20. The connecting rod 19 is articulated, at its inner end, about an inner axle 21 secured to the wing 1 and bears, at its outer end, the corresponding blanking piece 16 which is fixed to it using the screws 17. The connecting rod 20 for its part is articulated at one end about an axle 22 internal to said flap 3 and, at its other end, to said connecting rod 19 about an axle 23. The first connecting rod 19 has a convoluted shape, in a loop 24 in its central part, so that it can go around the edge 12R of the blind end of the cutout 12 when the flap 3 is in the deployed position (see FIG. 7).

To further improve the aerodynamic performance of the blanking pieces 16, these may have:

on their front edge, a seal 25 able, when the flap 3 is in the retracted position, to blank off the slot there is between them and the blind end edge 12R of the cutouts 12;

on their rear edge, a seal 26 able, also when the flap 3 is in the retracted position, to blank off the slot there is between them and the front edge 8 of said flap 3.

Figure 8:
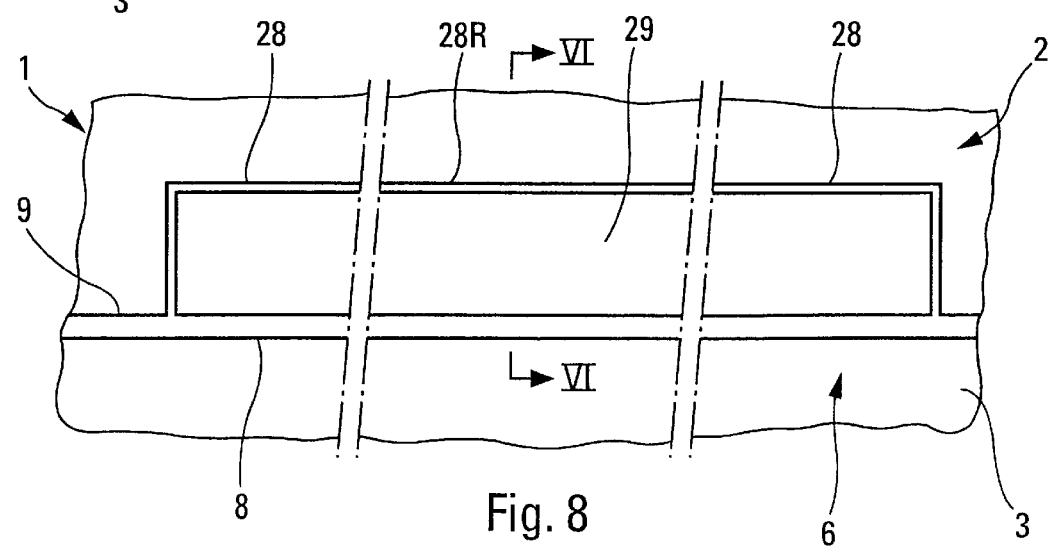
FIG. 8 illustrates, in a view similar to FIG. 5, an alternative form of embodiment of the present invention.

The embodiment of FIG. 8, the parts 27 of the rear edge 9 of the wing 1 that lie between several consecutive cutouts 12 have been cut away (see FIG. 7) to form a global cutout 28, with a blind end edge 28R. In addition, the corresponding blanking pieces 16 are replaced with a global blanking piece 29 tailored to said global cutout 28. It will be readily understood that the particulars described hereinabove with regard to the cutouts 12, the blanking pieces 16 and the linkage 18 apply to the global cutout 28, to the global blanking piece 29 and to the linkage for actuating the latter.

What is claimed is:

1. A device for articulating a flap to an aircraft aerodynamic surface, said flap having its front edge facing a rear edge of said aerodynamic surface and said articulation device comprising at least two fittings bearing said flap projecting forward with respect to said front edge and able to pivot, under the action of actuating means, about a common axle borne by said aerodynamic surface and arranged at the interior side thereof, in order to cause said flap to adopt:

either a retracted position, for which the outer face of said flap is in the aerodynamic continuation of the outer face of said aerodynamic surface;

or at least one deployed position, for which said flap is turned and projects with respect to the outer face of said aerodynamic surface, said rear edge of said aerodynamic surface comprising cutouts into which said fittings project when said flap is in the deployed position, wherein:

the portion of each fitting facing the corresponding cutout when said flap is in the retracted position is set back toward the inside with respect to the outer faces of the aerodynamic surface and of the flap;

a flat blanking piece, the shape of which corresponds to that of said cutout is associated with each cutout;

each blanking piece is borne by a linkage articulated to said aerodynamic surface and to said flap so that:

when said flap is in the retracted position, said linkage places said blanking piece in a blanking position for which said blanking piece is arranged in said cutout, ensuring aerodynamic continuity between said aerodynamic surface and said flap; and when said flap is in the deployed position, said linkage places said blanking piece in an outwardly offset position for which said blanking piece uncovers said cutout, allowing said flap to turn with respect to said aerodynamic surface.

2. The articulation device as claimed in claim 1, wherein said blanking piece is fixed removably to said linkage.

3. The articulation device as claimed in claim 1, wherein said blanking piece is fixed adjustably to said linkage.

4. The articulation device as claimed in claim 1, wherein said blanking piece is chosen from a set of blanking pieces of different sizes.

5. The articulation device as claimed in claim 1, wherein said linkage comprises:

at least one first connecting rod articulated, at one end, to said aerodynamic surface and bearing, at the other end, said blanking piece, and at least one second connecting rod articulated, at one end, to said flap and, at the other end, to said first connecting rod.

6. The device as claimed in claim 5, wherein said first connecting rod has a convoluted shape allowing it, when said flap is in the deployed position, to go around the edge of the blind end of said cutout.

7. The device as claimed in claim 1, wherein the front edge of said blanking piece bears a seal able, when the flap is in the retracted position, to blank off the slot there is between it and the edge of the blind end of said cutout.

8. The device as claimed in claim 1, wherein the rear edge of said blanking piece bears a seal able, when the flap is in the retracted position, to blank off the slot there is between it and the front edge of said flap.

9. A device for articulating a flap to an aircraft aerodynamic surface, said flap having its front edge facing a rear edge of said aerodynamic surface and said articulation device comprising at least two fittings bearing said flap projecting forward with respect to said front edge and able to pivot, under the action of actuating means, about a common axle borne by said aerodynamic surface and arranged at the interior side thereof, in order to cause said flap to adopt:

either a retracted position, for which the outer face of said flap is in the aerodynamic continuation of the outer face of said aerodynamic surface;

or at least one deployed position, for which said flap is turned and projects with respect to the outer face of said aerodynamic surface, said rear edge of said aerodynamic surface comprising cutouts into which said fittings project when said flap is in the deployed position, wherein:

between at least two consecutive cutouts, said rear edge of the aerodynamic surface is cut away to form one global cutout;

the portion of each fitting facing said global cutout when said flap is in the retracted position is set back toward the inside with respect to the outer faces of the aerodynamic surface and of the flap;

a flat global blanking piece the shape of which corresponds to that of said global cutout is associated with said global cutout;

said global cutout is borne by a linkage articulated to said aerodynamic surface and to said flap and such that:

when said flap is in the retracted position, said linkage places said global blanking piece in a blanking position for which said global blanking piece is arranged in said global cutout, ensuring aerodynamic continuity between said aerodynamic surface and said flap; and when said flap is in the deployed position, said linkage places said global blanking piece in an outwardly offset position for which said global blanking piece uncovers said global cutout, allowing said flap to turn with respect to said aerodynamic surface.

10. The articulation device as claimed in claim 9, wherein said global blanking piece is fixed removably to said linkage.

11. The articulation device as claimed in claim 9, wherein said global blanking piece is fixed adjustably to said linkage.

12. The articulation device as claimed in claim 9, wherein said global blanking piece is chosen from a set of global blanking pieces of different sizes.

13. The articulation device as claimed in claim 9, wherein said linkage comprises:

at least one first connecting rod articulated, at one end, to said aerodynamic surface and bearing, at the other end, said global blanking piece, and at least one second connecting rod articulated, at one end, to said flap and, at the other end, to said first connecting rod.

14. The device as claimed in claim 13, wherein said first connecting rod has a convoluted shape allowing it, when said flap is in the deployed position, to go around the edge of the blind end of said global cutout.

15. The device as claimed in claim 9, wherein the front edge of said blanking piece bears a seal able, when the flap is in the retracted position, to blank off the slot there is between it and the edge of the blind end of said global cutout.

16. The device as claimed in claim 9, wherein the rear edge of said blanking piece bears a seal able, when the flap is in the retracted position, to blank off the slot there is between it and the front edge of said flap.

* * * * *